Aug. 30, 1938.　　　　W. OWEN　　　　2,128,713
MIRROR PLATING APPARATUS
Filed Aug. 13, 1937　　　5 Sheets-Sheet 5

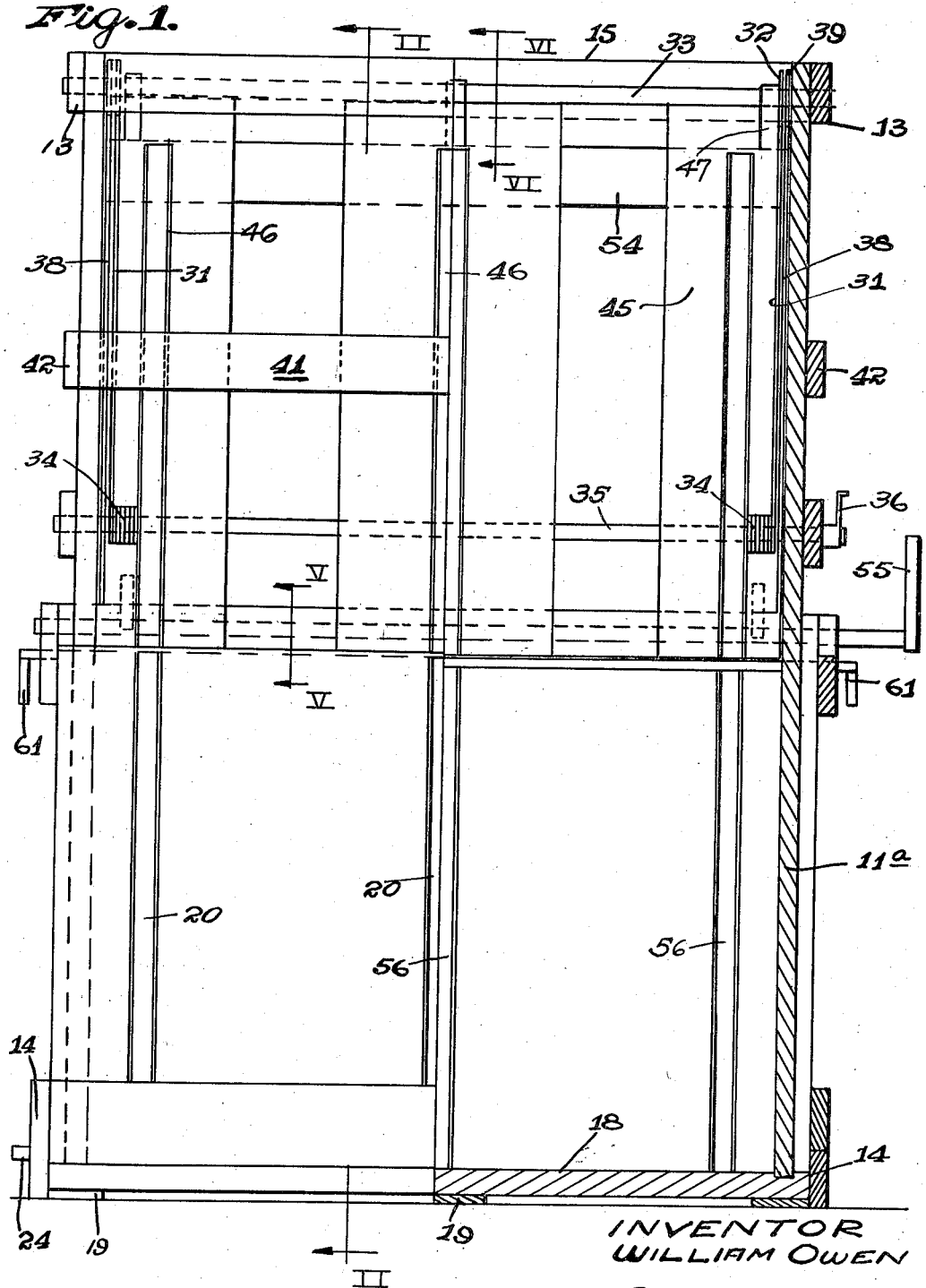

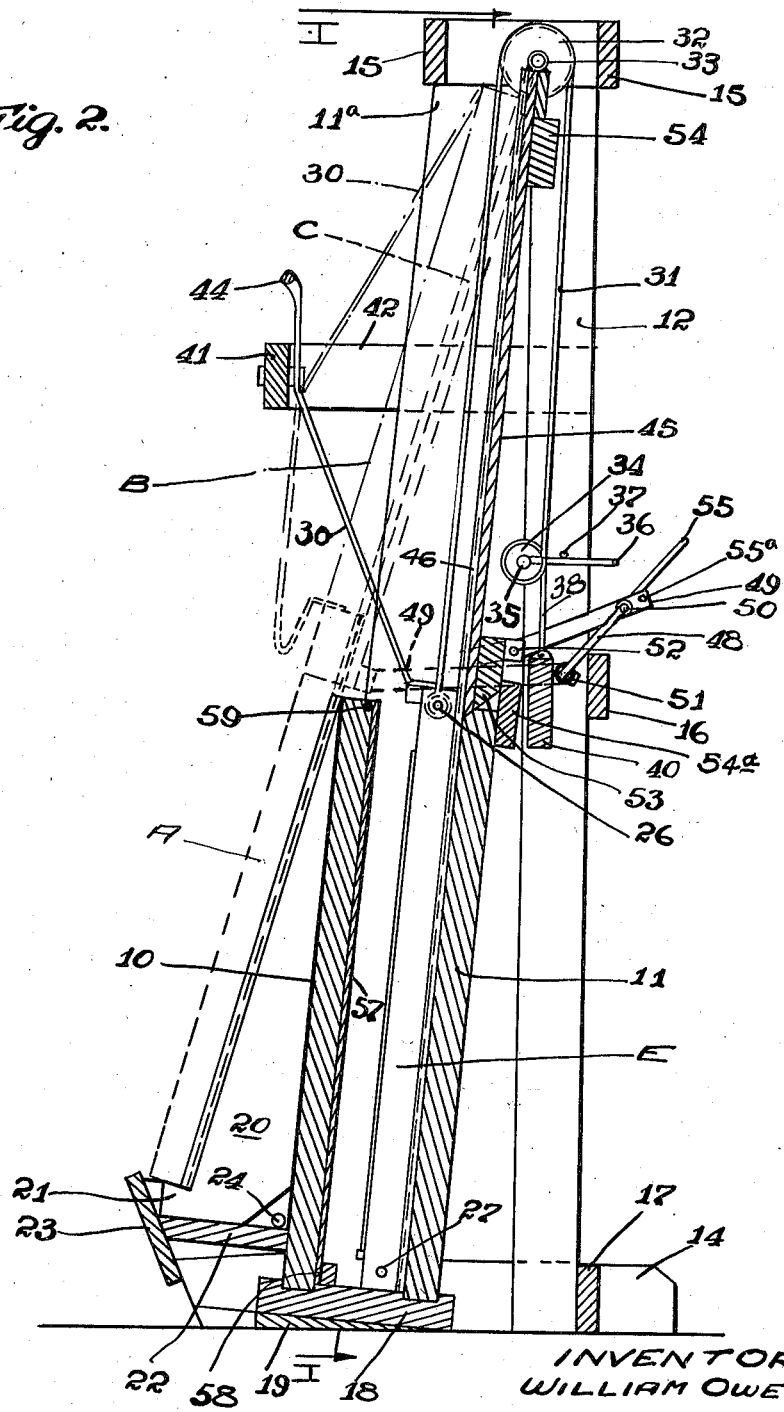

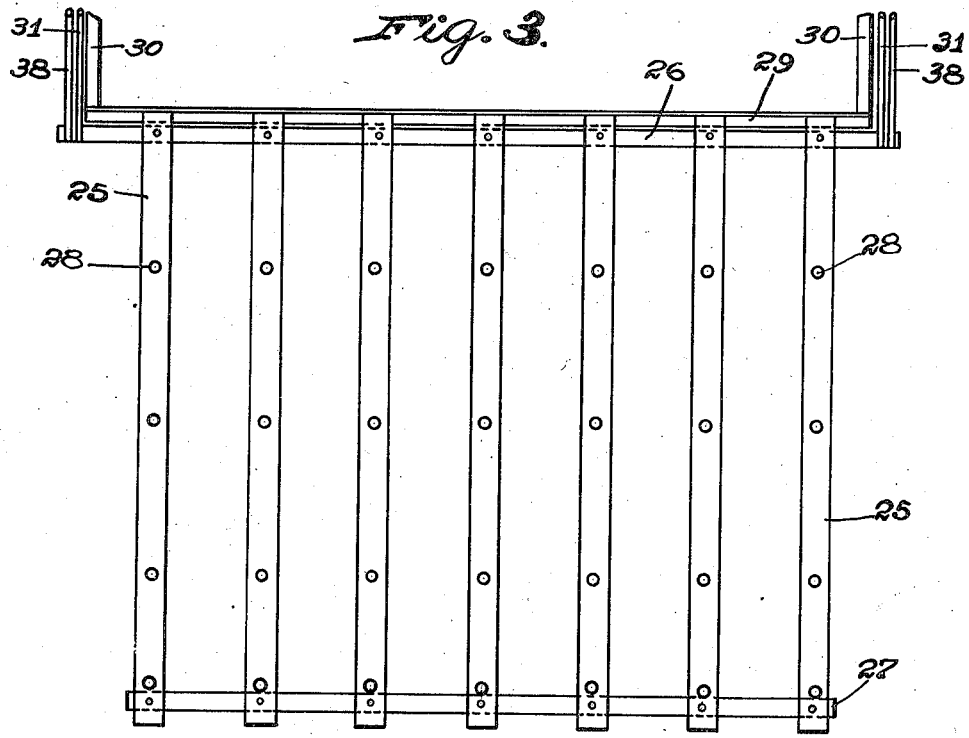
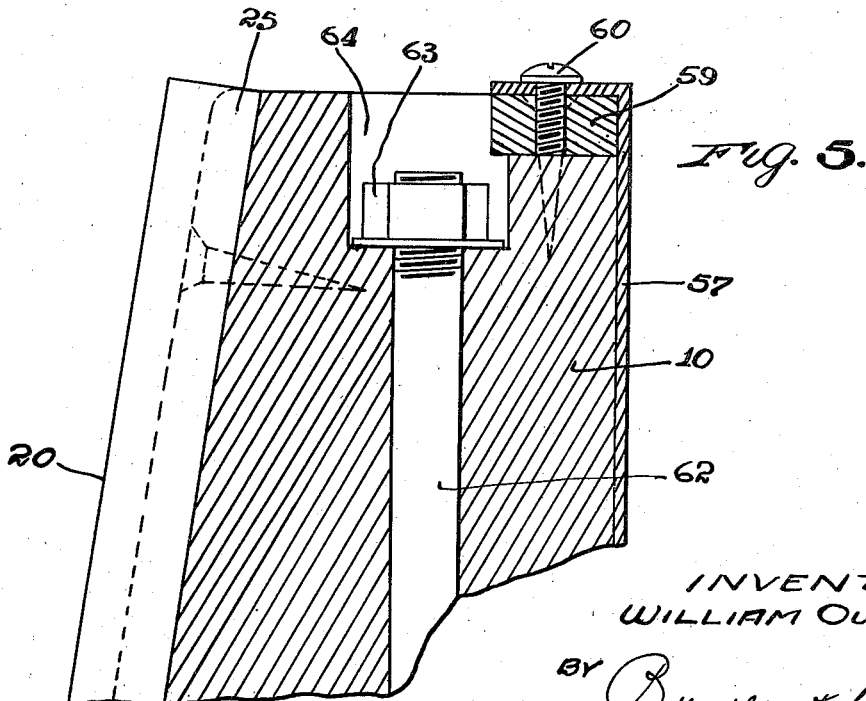

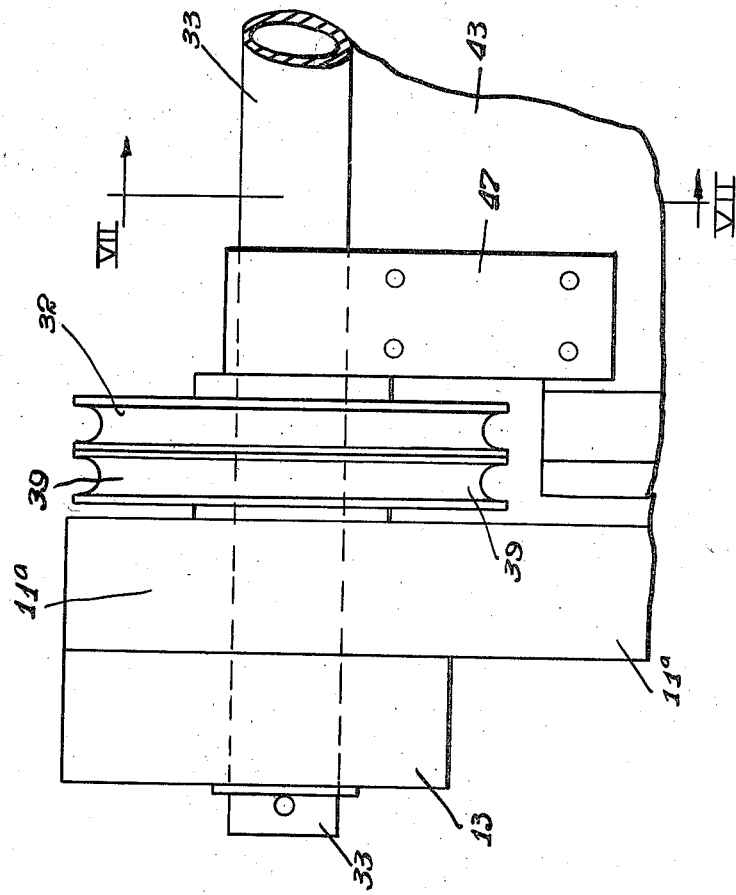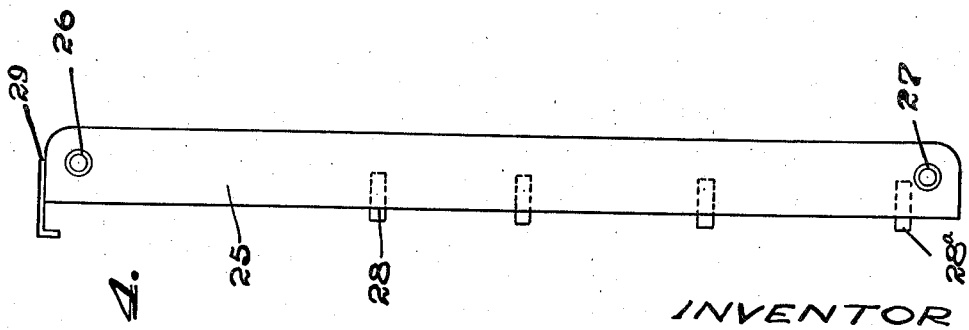

INVENTOR
WILLIAM OWEN

BY Bradley & Bee
ATTORNEYS.

Patented Aug. 30, 1938

2,128,713

UNITED STATES PATENT OFFICE 2,128,713

MIRROR PLATING APPARATUS

William Owen, Pittsburgh, Pa., assignor to Pittsburgh Plate Glass Company, Allegheny County, Pa., a corporation of Pennsylvania Application August 13, 1937, Serial No. 158,919

5 Claims. (Cl. 204—5)

Figure 7:
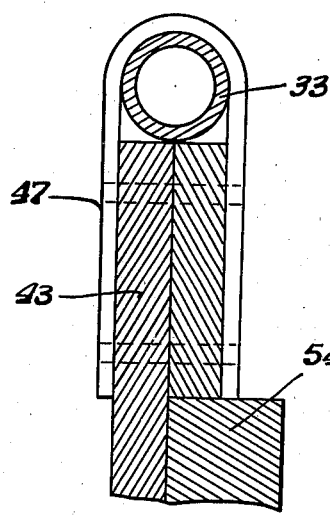
Figure 8:
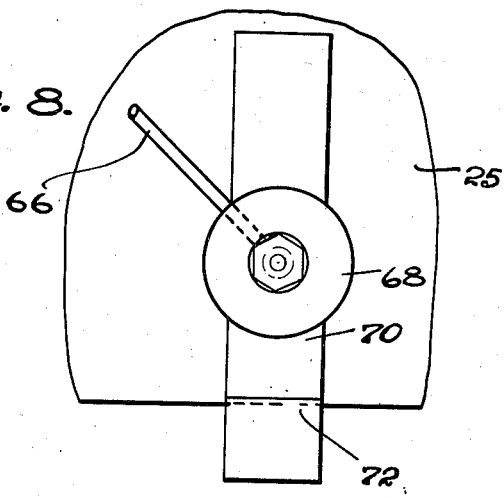
Figure 9:
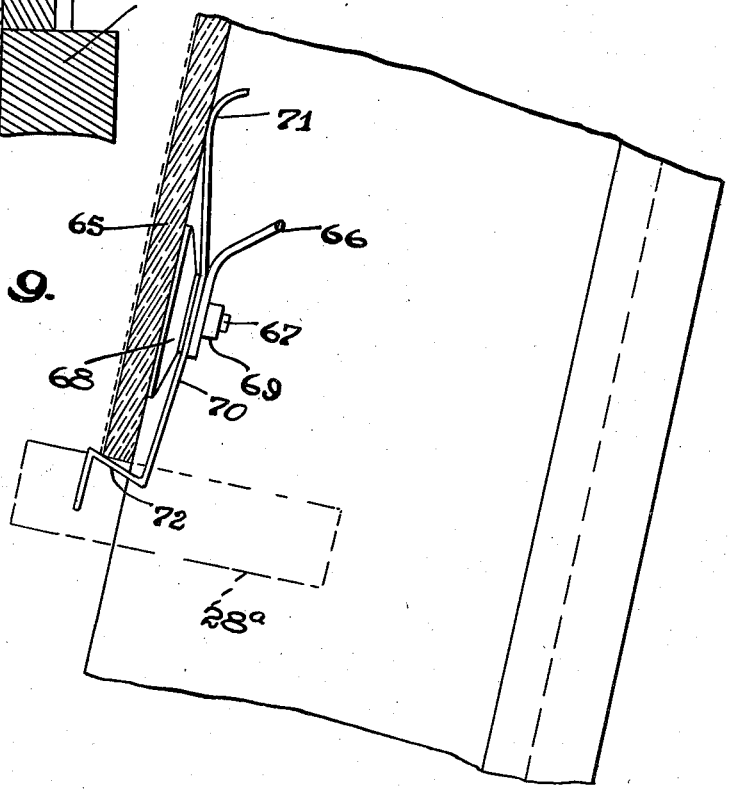

The invention relates to apparatus for electroplating the silvered surfaces of mirrors, ordinarily with copper, although there is no limitation in this respect in so far as the apparatus is concerned. The invention has for its objects the provision of improved apparatus for carrying out the electro deposition with the mirror plates in upright position, which is of cheap, simple construction and permitting of the safe and convenient shifting of the glass plates into and out of the plating bath. A further object is the provision of apparatus occupying a minimum of floor space in relation to its capacity, readily operated by one operator without danger of breakage of the glass plates or injury to the reflector films thereon. The foregoing and other objects which will be apparent to those skilled in the art are accomplished by the apparatus, the preferred embodiment of which is shown in the accompanying drawings, wherein:

Figure 1 is a partial front elevation and partial section on the line I—I of Fig. 2. Fig. 2 is a vertical section on the line II—II of Fig. 1. Figs. 3 and 4 are detail views of the glass shifting rack, Fig. 3 being a front elevation and Fig. 4 an end elevation. Fig. 5 is an enlarged section taken at the upper edge of the front wall of the tank. Figs. 6 and 7 are detail fragmentary views, Fig. 6 being a front elevation and Fig. 7 a section on the line VII—VII of Fig. 6. And Figs. 8 and 9 are enlarged detail views of one of the electrical connections, Fig. 8 being a front elevation and Fig. 9 a side elevation.

The tank is of the upright type being tilted slightly to the rear, as indicated in Fig. 2 and including a front wall 10 and a rear wall 11. The tank is supported upon a framework of A shape comprising two pairs of uprights 11a and 12 tied together at their upper ends by the strips 13, 13 (Fig. 1). At the lower ends the members 11a and 12 are tied together by the strips 14, 14, which serve to give the apparatus a relatively wide base. The two sets of members 11a and 12 are secured together by the transverse strips 15, 15 (Fig. 2) and 16, 17.

The bottom closure of the tank is a board 18 underneath which is located a plurality of wedges 19, 19, 19. The frame members 11a, 11a at the two ends of the tank constitute the end walls of the tank (Fig. 1). Secured to the front wall 10 of the tank is a rack support consisting of three members 20, 20, 20 provided with toes 21 at their lower ends for supporting the rack, which is later described. The boards 22 and 23 (Figs. 1 and 2) constitute the bottom and front wall of a trough for receiving the drainage from the rack, such trough being provided at its end with a drainage pipe 24. The tank itself is provided at one end of its bottom portion with a drainage pipe which is not shown.

The rack carrying the glass, which in loading rests upon the toes 21, as shown in dotted lines at A in Fig. 2, is constructed as indicated in Figs. 3 and 4, and comprises a plurality of parallel bars 25 pinned at their ends to the pipes 26 and 27. The bars are provided on their front sides with sockets 28 for receiving the pins 28a (Fig. 4) so that by a suitable arrangement of such pins, any desired size and number of glass sheets may be carried on the rack. In some cases, only one large sheet will be carried on the rack, and in other cases, a number of small sheets, and in such cases the pins may be adjusted to suit requirements. Also secured to the upper end of the rack is a metal angle strip 29, to which the leads 30, 30 for supplying current are connected. In using the apparatus, suitable wires are connected to the strip 29 carrying at their ends connectors for making contact with the metal films on the glass sheets. One type of such connectors are shown in Figs. 8 and 9, later described. The rack is moved vertically to a position so that it can be shifted into the tank by means of a pair of cables 31, 31 attached to the ends of the pipe 26 and leading around a pair of sheaves 32 mounted for rotation on a hollow shaft 33 in the upper end of the A-frame. These cables extend downwardly on the rear side of the A-frame and are secured to a pair of drums 34, 34 mounted on a transverse shaft 35 just above the rear wall of the tank. This shaft is provided with a handle 36 for raising and lowering the rack, a pin 37 being provided fitting in a socket in the frame for holding the handle in a position shown in Fig. 2 when the rack is in raised position, as indicated in dotted lines at B in Fig. 2. In order to counterweight the rack, a second pair of cables 38, 38 are attached to the ends of the pipe 26 and extend up over the sheaves 39, 39 also mounted on the shaft 33. These cables loop around the drums 34 and are secured at their ends to a transverse metal bar 40 which constitutes the counterweight. The leads 30 are attached at their ends to a bar 41 (Fig. 1) carried by the side members 42, 42, the members 42, 42 being bolted at their ends to the A-frame. The terminals on the bar 41 are supplied with current from the lead 44.

Pivotally supported upon the shaft 33 is a guard and shifting plate 45 having upon its front face the three guide strips 46, 46, 46. Connection is made between the upper edge of the board 45 and the shaft 33 by means of the straps 47, which loop around the shaft and are bolted to the board, as indicated in Fig. 7. When the rack with its load of mirror plates is moved to upper position, as indicated at B in Fig. 2, the plate 45 occupies the dotted line position indicated at C in Fig. 2, the board at such time being in alinement with the front faces of the members 20, so that the strips 46 on the front of the board act as a track upon which the rack slides in moving up and down between positions A and B. Means are provided for shifting the plate 45 from the dotted line position C to the full line position shown in Fig. 2, in which latter position, the board is in alinement with the rear wall 11 of the tank. This means comprises two pairs of toggle links 48 and 49 pivoted together at 50, the links 48 being pivoted to the A-frame on the pipe 51 and the links 49 being pivoted to the plate at 52. The plate 45 is reinforced at its upper and lower edges by the transverse battens 53 and 54 and when the plate is in the full line position shown in Fig. 2, the batten 53 engages a stop strip 54a secured to the upper wall of the tank 11. The pipe 51 which carries the links 48 is provided at its end with a handle 55. When it is desired to shift the plate 45 from its full line position to the dotted line position C of Fig. 2, the handle 55 is swung in a counter-clockwise direction, thus moving the links 49 to the left and bringing the plate to the dotted line position. When this position is reached, the links 48 and 49 are in alinement and stop pins 55a on the links 49 engage the tops of the links 48 so that the parts when moved to the dotted line position C are maintained in such position by the alinement of the links.

After the plate 45 is swung to the full line position shown in Fig. 2, the rack carrying the glass plates is lowered to the full line position E (Fig. 2) inside the tank and surrounded by the electrolytic bath which is of the usual character. In the downward movement into the tank, the rack lies against the guides 46, 46, 46 on the plate 45 and also against corresponding guide strips 56 (Fig. 1) secured to the front face of the back wall 11 of the tank. At this time the silvered faces of the glass sheets lie in opposition to the front wall 10 of the tank, and such wall is provided with an anode preferably in the form of a copper sheet 57, which may be made up of one sheet or a plurality of sheets, and covers substantially the entire face of the wall 10. This plate fits in behind the bar 58 at its lower end, and at its upper end is bent around a metal bar 59 mounted in the upper edge of the member 10, as indicated in Fig. 5, the turned over edge of the plate 57 being secured by means of the machine screws 60. Suitable connection for supplying current to the bar 59 is provided in the form of the leads 61 attached to the ends of the bar, as indicated in Fig. 1. The bottom wall 18 of the tank is secured against the lower edges of the front and rear walls 10 and 11 of the tank by means of the bolts 62 (Fig. 5), which extend longitudinally of such members 10 and 11 and carry the nuts 63 seated in recesses 64 in the upper edges of the walls.

Figs. 8 and 9 show the preferred means for making connection between the silvered surface of the glass plate 65 and the wires 66 which lead down from the bar 29 heretofore referred to. These wires are electrically connected at their lower ends to bolts 67 carried by small vacuum cups 68. The nut 69, which clamps the end of the wire 66, also holds a leaf spring 70 whose upper end 71 bears against the rear face of the glass sheet. The lower end of this spring is recurved, as indicated at 72, and makes contact with the metallic coating on the glass sheet. The clip device, as described, forms a convenient means of making the necessary connection with the silvered film, but it will be understood that other forms of clips well known in the art may be substituted, all that is necessary being a suitable releasable connection at intervals along the edge of the plate.

The operation starting with the rack in position A of Fig. 2 is as follows: The rack now rests upon the toe 21 at the bottom of the tank and may be loaded with the silvered plate or plates which are to be electroplated. After the rack is loaded, connection is made between the wires 66 leading from the bar 29 and the rack may now be shifted to the position E inside the tank for the plating operation. The shifting plate 45 being at this time at the dotted line position C, the handle 36 is operated to lift the rack to the dotted line position B with its lower end above the top of the tank. The handle 36 is now locked in position by the pin 37 and the handle 55, which operates the shifting links 48 and 49, is moved in a clockwise direction to the full line position of Fig. 2, thus swinging the plate 45 to the right and bringing the rack carrying the glass sheets into alinement with the open end of the tank. The pin 37 is next removed and the handle 36 is operated to lower the rack to the full line position E shown in Fig. 2, where it is left until the plating operation is completed. Upon the completion of the plating operation, the rack is raised by means of the handle 36, so that its lower end lies above the top of the tank, and upon shifting the handle 55 to the left, the guide plate 45 is swung to position C so that the rack is in position to be lowered. This is accomplished by rotating the handle 36 until the rack reaches the dotted line position A when the plates may be removed, thus completing the cycle. The plate 45 not only acts as a shifting and guide means, but also as a drain board, the excess liquid on the rack and parts supported thereby draining along the front surface of the plate and back into the bath, while it is maintained for a short interval in the full line position shown.

What I claim is:

1. In combination in apparatus for electroplating glass sheets having metallic reflecting coatings thereon, a narrow upright tank for the electroplating bath, a guide and shifting plate mounted above the tank in alinement with the rear wall thereof and supported to permit it to be shifted forwardly so that it is in alinement with the front wall of the tank, means for shifting said plate back and forth, a rack support mounted on the front wall of the tank at an angle to the vertical, a glass rack adapted to be supported in loading position on said rack support in parallel therewith, lifting tackle mounted adjacent the upper end of the guide and shifting plate for raising the glass rack and lowering it into the tank and for raising it from the tank and lowering it onto the rack support, and an anode in the tank adjacent the front wall thereof.

2. In combination in apparatus for electroplating glass sheets having metallic reflecting coatings thereon, a narrow upright tank for the electroplating bath, a guide and shifting plate mounted above the tank in alinement with the rear wall thereof and pivotally supported at its upper end so that its lower end can be shifted forwardly so that it is in alinement with the front wall of the tank, means for shifting said plate back and forth, a rack support mounted on the front wall of the tank at an angle to the vertical, a glass rack adapted to be supported in loading position on said rack support in parallel therewith, lifting tackle mounted adjacent the upper end of the guide and shifting plate for raising the glass rack and lowering it into the tank and for raising it from the tank and lowering it onto the rack support, and an anode in the tank adjacent the front wall thereof.

3. In combination in apparatus for electroplating glass sheets having metallic reflecting coatings thereon, a narrow upright tank for the electroplating bath, a guide and shifting plate mounted above the tank in alinement with the rear wall thereof and supported to permit it to be shifted forwardly so that it is in alinement with the front wall of the tank, means for shifting said plate back and forth, a rack support mounted on the front wall of the tank at an angle to the vertical, a glass rack adapted to be supported in loading position on said rack support in parallel therewith, lifting tackle mounted adjacent the upper end of the guide and shifting plate for raising the glass rack and lowering it into the tank and for raising it from the tank and lowering it onto the rack support, means for counter-weighting the rack, cathode connections carried by the rack, and an anode in the tank adjacent the front wall thereof.

4. In combination in apparatus for electroplating glass sheets having metallic reflecting coatings thereon, a narrow upright tank for the electroplating bath, tilted slightly to the rear from the vertical, a guide and shifting plate mounted above the tank in alinement with the rear wall thereof adapted to drain into the tank and supported to permit it to be shifted forwardly so that it is in alinement with the front wall of the tank, means for shifting said plate back and forth, a rack support mounted on the front wall of the tank at an angle to the vertical, a glass rack adapted to be supported in loading position on said rack support in parallel therewith, lifting tackle mounted adjacent the upper end of the guide and shifting plate for raising the glass rack and lowering it into the tank and for raising it from the tank and lowering it onto the rack support, and an anode in the tank adjacent the front wall thereof.

5. In combination in apparatus for electroplating glass sheets having metallic reflecting coatings thereon, a narrow upright tank for the electroplating bath, a guide and shifting plate mounted above the tank in alinement with the rear wall thereof and supported to permit it to be shifted forwardly so that it is in alinement with the front wall of the tank, means for shifting said plate back and forth, a rack support mounted on the front wall of the tank at an angle to the vertical, a glass rack adapted to be supported in loading position on said rack support in parallel therewith, lifting tackle mounted adjacent the upper end of the guide and shifting plate for raising the glass rack and lowering it into the tank and for raising it from the tank and lowering it onto the rack support, cathode connections carried by the rack, and an anode in the tank comprising metal plating covering the inner face of the front wall of the tank and readily removable therefrom.

WILLIAM OWEN.